United States Patent [19]

Gullace

[11] 4,443,335
[45] Apr. 17, 1984

[54] AERATION DEVICE

[76] Inventor: Michael Gullace, 3805 Dogwood St., NW., Uniontown, Ohio 44685

[21] Appl. No.: 389,769

[22] Filed: Jun. 18, 1982

[51] Int. Cl.³ .................................... C02F 7/00
[52] U.S. Cl. ........................... 210/220; 210/205; 261/DIG. 75
[58] Field of Search ............... 210/169, 220, 198.1, 210/221.2, 205; 261/DIG. 75

[56] References Cited

U.S. PATENT DOCUMENTS 4,264,039  4/1981  Moreland .............. 261/DIG. 75
4,308,138 12/1981  Woltman ............... 261/DIG. 75

Primary Examiner—Charles N. Hart
Assistant Examiner—Sharon T. Cohen
Attorney, Agent, or Firm—Fleit, Jacobson, Cohn & Price

[57] ABSTRACT

An aeration device for introducing air into a pool of water. The device basically comprises a cylindrically shaped main body portion and a retaining ring for pivotally securing a generally spherically shaped water direction spout within a portion of the main body. The main body has a hollow interior. One end of the main body terminates in a threaded portion adapted to be received in a conventional water supply port found in the wall of the pool. A tube has one end in fluid communication with the spout and the other end exposed to ambient air. As water passes from the water supply port through the water direction spout, a suction is created, drawing air through the tube and into the flow stream of the water for introduction into the pool.

1 Claim, 2 Drawing Figures

AERATION DEVICE

FIELD OF THE INVENTION

The present invention relates to an aeration device for use in a swimming pool, a large water tank, or the like.

BACKGROUND OF THE INVENTION

It has long been known to use aeration to purify water. There are any number of aeration devices used with a swimming pool or large aquarium to introduce air into the water. These devices are characterized by their requirement that a dedicated apparatus be used to introduce the air into the water. In such prior art devices, ambient air is pumped into the water. The amount of air introduced into the water is directly related to speed and displacement of the pump.

Thus, in order to aerate the water contained in the swimming pool, it is necessary to provide for auxiliary equipment in the form of an aeration machine. There is, thus, a need for an economical device which will permit the introduction of air into a pool with little or no alteration of the pool and without the use of cumbersome auxiliary equipment. The present invention is directed toward filling that need.

SUMMARY OF THE INVENTION

The present invention relates to a device for introducing air into a pool of water and, thus, aerate the water in the pool. Basically, the device comprises a generally cylindrically shaped conduit adapted to be mounted in a conventional water outlet customarily used to provide water to fill or maintain the water level constant in the swimming pool. The other side of the conduit receives a retaining ring which movably holds a spherically shaped ball member in place. The ball member is capable of being placed into a number of different positions in order to alter the direction of the water being introduced into the pool. Water passes from a supply source through the hollow cylinder and through the water-directing member which is also hollow. Defined within the sphere is an auxiliary path that also passes through the conduit and terminates at the exterior of the aeration device. The path, near the exterior of the device, is configured to receive a hose or flexible tubing which extends in an upward direction when in its position of intended use. The hose is of sufficient length so that its free end protrudes above the water level in the pool. In this way, the free end is exposed to ambient air without being subjected to the introduction of water. A conventional fastener is used to secure the free end of the hose to the side of the pool when the device is in use.

It is thus a primary object of the present invention to provide an economical aeration device for use in a pool or the like.

It is another object of the present invention to provide an aeration device which may be used with existing pools without alteration to the pool.

These and other objects will become apparent when considered in light of the following detailed description when taken in conjunction with the drawings.

DETAILED DESCRIPTION OF THE INVENTION

Figure 1:
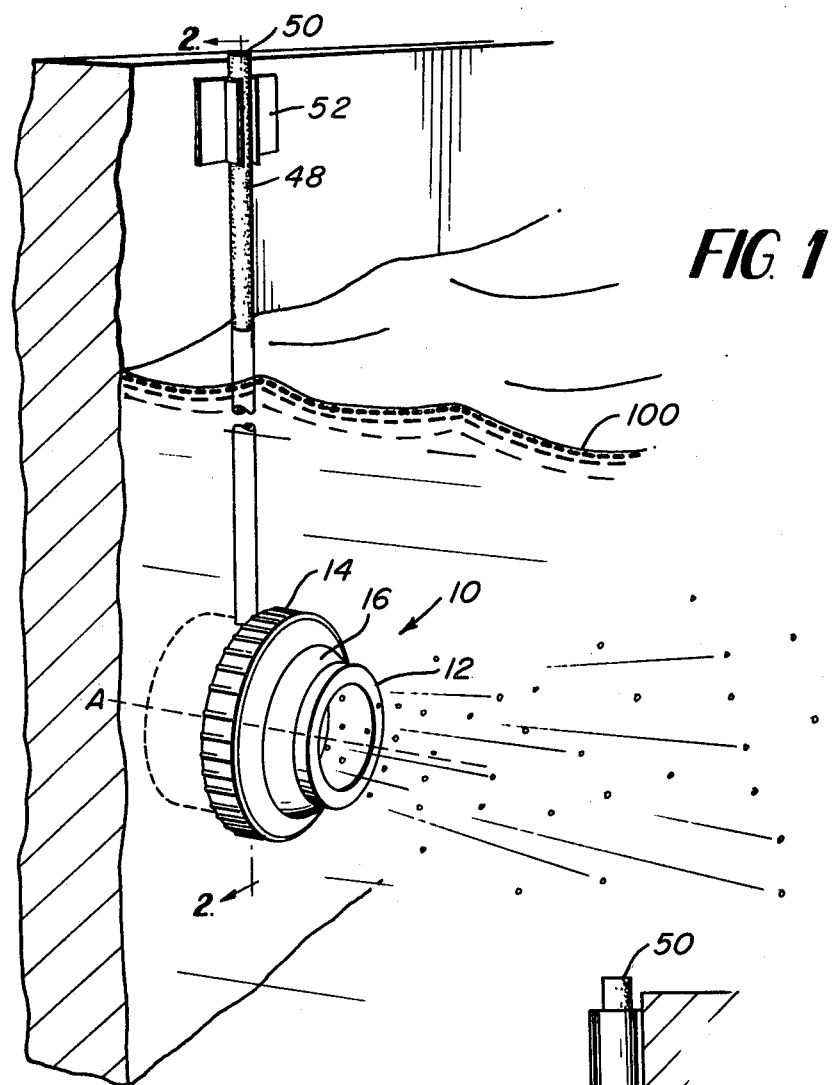
FIG. 1 is a perspective view of the aeration device mounted on one of the water introduction ports of a swimming pool.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalence which operate in a similar manner to accomplish a similar purpose.

Figure 2:
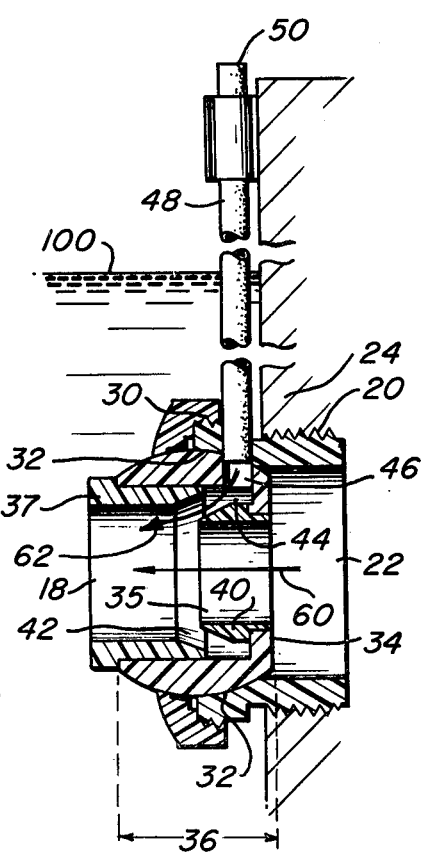
FIG. 2 is a section taken along line 2—2 of FIG. 1.

With reference to FIGS. 1 and 2, the aeration device is generally designated as 10 and basically comprises a cylindrically shaped main body portion 12 and a retaining ring 14 for pivotally securing a generally spherically shaped water direction spout 16 within a portion of the body 12. The cylindrical body portion has a hollow cylindrically shaped interior 18 and a longitudinal axis A. One end of the body 12 terminates in a threaded portion 20 adapted to be received in a conventional water supply spout or port 22 found in the wall 24 of a conventional swimming pool. Typically, all of the components constituting the aeration device 10 are made of plastic.

The other end of the body portion terminates in a forward threaded portion 30 sized to receive the retaining ring 14. The hollow interior of the body, in the area of the forward threaded portion 30, contains a concave surface 32 which mates with the convex surface of the spherical spout 16. In this way, the spout may be positioned for universal movement within the hollow portion 32 and rotated in order to direct the water passing therethrough in a desired direction.

The spherical portion contains a back end 34 having an exterior surface that mates with the interior of the hollow body 32. The major structural portion 36 defines the generally hollow sphere 16 as having a cylindrically shaped interior surface 35. A spout insert 37 of generally cylindrical shape is sized to be force fit within the interior of the major portion of the sphere 36. The spout insert 37 is removable and, thus, may be replaced should it be damaged.

A cylindrically shaped hollow back-end insert 40 is received within the rear portion 34 of the sphere. The spout insert 37 and the cylindrical insert 40 are configured so that they provide a generally frustoconical volume 42 which is in direct communication with the hollow portion of the sphere. As can be seen in FIG. 2, all of the structural elements described thus far are positioned so that they are essentially concentric about axis A. A cylindrically shaped hollow conduit 44 defined in the sphere 16 communicates with a similarly dimensioned conduit 46 defined in the main body 20. The conduit 44 also communicates with the frustoconical volume 42, thus, providing a clear path from the exterior of the aeration device to the hollow portion where water generally flows.

The hollow conduit 46 is sized to receive a hollow tube 48. The tube may be secured to the device by force fit or by a suitable adhesive. The tube is of sufficient length so that its free end 50 protrudes above the water level 100 when the device is mounted on the water spout 22 of the pool. A conventional fastener 52 secures the free end of the hose to the side of the pool.

In operation, water passes through the pool inlet or spout 22, and through the fluid communication channel defined within both the body 20 and the spherical portion 36. The path of the water through this channel is generally indicated by arrow 60. As the water passes through the device into the pool, it creates a suction force about the frustoconical volume 42. The suction volume draws in outside air through the free end of the hose 50 and into the path of water travel through the channel. The flow of the air is generally designated by arrow 62. In this way, the amount of air to be introduced is directly related to the volume of water per unit time being introduced into the pool.

Although the present invention has been shown and described in terms of a specific preferred embodiment, it will be appreciated by those skilled in the art that changes or modifications are possible which do not depart from the inventive concepts described and taught herein. Such changes and modifications are deemed to fall within the purview of these invention concepts.

What is claimed is:

1. An aeration device for use in introducing air into a pool of water, said device comprising:

means for securing said device to a conventional water introduction threaded spout, protruding through a wall of an enclosure containing said pool of water;

said means for securing said device including a threaded retaining ring;

said threaded retaining ring secures a spherical portion of said aeration device and said threaded spout;

water-directing means including a conduit for directing water from said spout through said spherical portion into said pool;

means within said conduit for creating a suction within said conduit as water passes as a flow stream into the pool;

means for responding to said suction by permitting the introduction of ambient air into said flow stream, thus, aerating the water entering the pool;

said means for responding comprises a channel creating fluid communication between said flow stream and the exterior of the device, and air means for connecting said channel to a source of ambient air; and said air means is a tube having one end connected to said channel and the other end positioned above the water level of said pool, said tube secured to said wall of said enclosure on the same side of said wall through which said spout protrudes and connects with said aeration device.

* * * * *